United States Patent Office 3,709,853
Patented Jan. 9, 1973

3,709,853
POLYMERIZATION OF ETHYLENE USING SUPPORTED BIS - (CYCLOPENTADIENYL)CHROMIUM [II] CATALYSTS
George L. Karapinka, Piscataway, N.J., assignor to Union Carbide Corporation, New York, N.Y.
Continuation-in-part of applications Ser. No. 708,638, Feb. 27, 1968, and Ser. No. 769,696, Oct. 22, 1968, said applications being a continuation-in-part of application Ser. No. 682,045, Nov. 13, 1967, all now abandoned. This application Apr. 29, 1971, Ser. No. 138,611
Int. Cl. C08f 1/74, 3/06
U.S. Cl. 260—88.2 D     23 Claims

ABSTRACT OF THE DISCLOSURE

Supported bis - (cyclopentadienyl)chromium[II] catalysts, which are formed when a bis-(cyclopentadienyl) chromium[II] compound is adsorbed on an inorganic oxide having a high surface area, have been found to be unusually effective catalysts for the polymerization of ethylene over a wide range of reaction conditions. The activity of these catalysts can be markedly increased in the presence of hydrogen and the relationship of the melt index of the polymer to the hydrogen and ethylene concentrations used in the polymerization reaction has been found to be governed by the equation $$\ln MI = k \ln \frac{[A]}{[A+B]} + \ln C \qquad (1)$$

where MI represents the melt index of the polyethylene, A represents the hydrogen concentration in mole percent, B represents the ethylene concentration in mole percent, and $k$ and $C$ represent empirically-determined constants.

CROSS REFERENCE TO RELATED APPLICATIONS

This application is a continuation-in-part of applications Ser. No. 708,638, filed Feb. 27, 1968 and Ser. No. 769,696, filed Oct. 22, 1968; each of said applications Ser. No. 708,638 and Ser. No. 769,696 being a continuation-in-part of application Ser. No. 682,045, filed Nov. 13, 1967; and all of said applications Ser. No. 682,045, Ser. No. 708,638 and Ser. No. 769,696 being abandoned.

INTRODUCTION

This invention relates to the polymerization of ethylene to form either polyethylene, interpolymers of ethylene and other α-olefins, or interpolymers of ethylene and diolefins. The invention is based on the discovery that a supported bis - (cyclopentadienyl)chromium[II] compound, formed by adsorption of the organochromium compound on an inorganic oxide catalyst support, is an unusually effective catalyst for the polymerization of ethylene, particularly when the polymerization reaction is conducted in the presence of hydrogen. The invention provides an improved process for the polymerization of ethylene by which it is possible to produce high molecular weight polyethylene having a narrow molecular weight distribution and being essentially free from internal and terminal unsaturation.

SUMMARY OF THE INVENTION

By itself, an unsupported bis-(cyclopentadienyl)chromium[II] compound is, generally speaking, incapable of initiating the polymerization of ethylene. However, when the bis - (cyclopentadienyl)chromium[II] compound is contacted with an inorganic oxide catalyst support having a high surface area in such manner that it becomes adsorbed (or deposited, the two terms being used interchangeably) on the inorganic oxide, there is formed an unusually effective catalyst, in the absence of moisture and of air, for the polymerization of ethylene over a wide range of reaction conditions. By polymerizing ethylene in the presence of a supported bis-(cyclopentadienyl) chromium[II] catalyst, it is possible to produce either polyethylene, interpolymers of ethylene and other α-olefins, or cross-linkable interpolymers of ethylene and diolefins.

Figure 1:
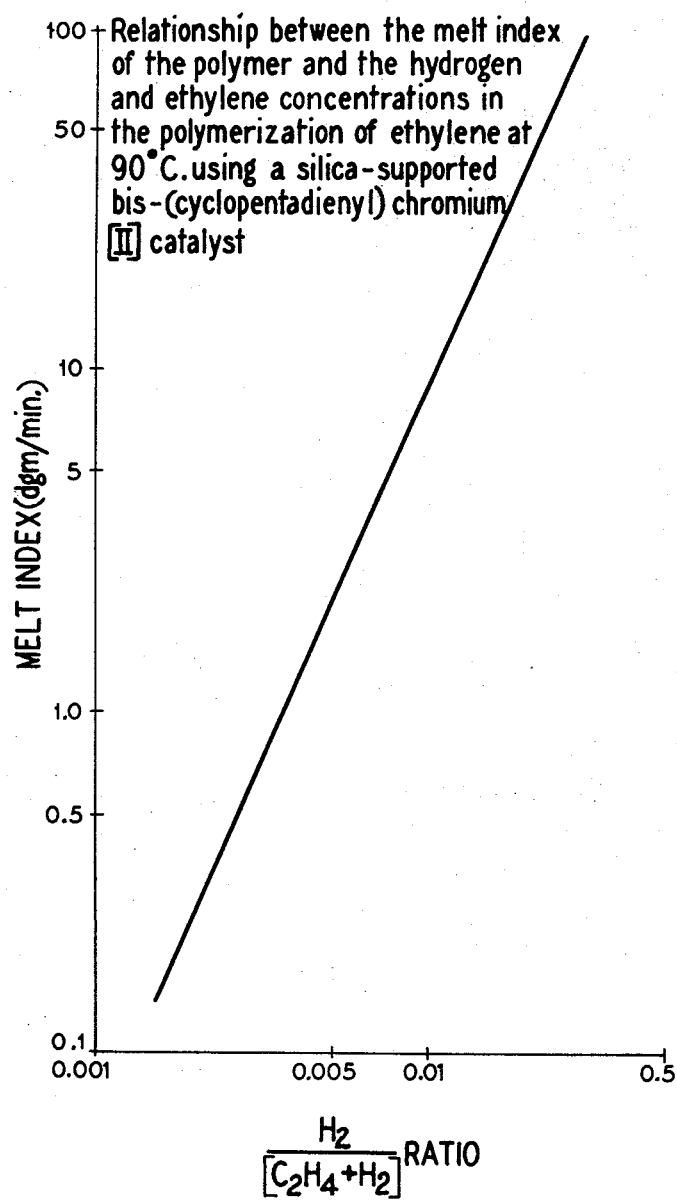
FIG. 1 shows a linear relationship between the melt index of ethylene polymers, and the hydrogen and ethylene concentrations used to provide such polymers.

Based on the discoveries of the applicant, the present invention provides an improved process for the polymerization of ethylene which comprises contacting ethylene with a catalytic amount of a bis-(cyclopentadienyl) chromium[II] compound adsorbed onto, and supported by, an inorganic oxide catalyst support having a high surface area, at a temperature and at a pressure sufficient to initiate the polymerization reaction. As used herein, the term "a bis - (cyclopentadienyl)chromium[II]" includes not only bis-(cyclopentadienyl)chromium[II] but substituted derivatives thereof in which the cyclopentadienyl rings contain one or more substituents which do not affect the ability of the adsorbed substituted bis-(cyclopentadienyl)chromium[II] compound to function as an ethylene polymerization catalyst.

THE BASIC PARAMETERS OF THE PROCESS

The process of the invention may be more fully understood by a discussion of (a) the formation of the supported bis-(cyclopentadienyl)chromium[II] catalyst which results from adsorption of the organochromium compound on an inorganic oxide catalyst support having a high surface area, and (b) the polymerization of ethylene, above, or with other olefins, by contact of the monomer charge with a catalytic amount of the supported bis-(cyclopentadienyl)chromium[II] catalyst at a temperature and at a pressure sufficient to initiate the polymerization reaction.

THE CATALYST

Bis-(cyclopentadienyl)chromium[II] may be prepared by a variety of methods, such as by the reaction of sodium cyclopentadiene with chromous chloride which is described more fully in the Brantley U.S. Pat. No. 2,870,-183, or by reacting an excess of sodium cyclopentadiene with chromic chloride.

A preferred procedure for preparing bis-(cyclopentadienyl)chromium[II] involves reacting cyclopentadienyl sodium (3 mol equivalents) with anhydrous chromium trichloride (1 mol equivalent) in tetrahydrofuran at about 0° C. under a nitrogen atmosphere. When this reaction is complete the solvent is evaporated off and the residue is sublimed at about 70°–120° C. at a pressure of about 0.5 mm. Hg. The sublimed crystals of bis-(cyclopentadienyl)chromium[II] had a melting point of 168°–170° C. (literature melting point=173° C.).

Bis-(cyclopentadienyl)chromium[II], which possesses the empirical formula $(C_5H_5)_2Cr$, is a reddish-purple compound having a crystalline form. It is easily oxidized and very sensitive to air, properties which necessitate the careful handling of the compound during the preparation of the supported catalyst.

To prepare the supported catalyst, the bis-(cyclopentadienyl)chromium[II] compound is contacted with a substantially anhydrous inorganic oxide having a high surface area under conditions such that the bis-(cyclopentadienyl) chromium[II] compound is adsorbed on and supported by the inorganic oxide. Among the various inorganic oxides which may be used to form a supported bis-(cyclopentadienyl)chromium[II] catalyst are silica, alumina, thoria, zirconia, and admixtures thereof, such as silica-alumina. To be more effective, these supports must have a high surface area to adsorb a sufficient quantity of the bis-(cyclopentadienyl)chromium[II] compound and to provide sufficient contact between the catalyst and the monomer. As a general rule, inorganic oxides having a surface area in the range from about 50 to about 1000 square meters per gram should be employed as the catalyst support. The particle size of these supports is not particularly critical, provided, however, that the support has a high surface area.

Because the bis-(cyclopentadienyl)chromium[II] compounds are also sensitive to moisture, the catalyst support should be completely dried before it is brought into contact with the organochromium compound. This is normally done by simply heating or pre-drying the catalyst support with an inert gas prior to use. Surprisingly, however, it has been found that the temperature of drying has an appreciable effect on the relative productivity of the catalyst system, and on the molecular weight distribution and melt index of the polymer produced.

Drying or activation of the support can be accomplished at nearly any elevated temperature up to about its sintering temperature for a period of time which is at least sufficient to remove the adsorbed water. The drying time should not be so prolonged as to cause the removal of all of the chemically bound water. Passing an inert gas stream through the support during the drying aids in the displacement of the water. The use of activation temperatures of from about 200° C. to about 900° C. for a short period of about six hours or so should be sufficient, if a well dried inert gas is used, and the temperature is not permitted to get so high as to completely remove the chemically bound hydroxyl groups on the surface of the support.

Any grade of support can be used herein, but the microspherodial intermediate density (MSID) grade of silica having a surface area of 258 square meters per gram and a pore diameter of about 288 A., and the intermediate density (ID) grade of silica having the same area but a pore diameter of 164 A., are preferred. Other grades, such as G-968 silica and G-966 silica-alumina, as so designated by W. R. Grace and Co., which have surface areas of 700 and 500 square meters per gram, respectively, and pore diameters of 50-70 A., are also quite satisfactory. Variations in melt index control and in polymer productivity can be expected by the use of different grades of supports.

A dry supported catalyst may be conveniently prepared in the absence of solvent by direct vapor deposition (sublimation) of the selected bis-(cyclopentadienyl)chromium[II] compound onto a dry support. This may be simply and conveniently accomplished by blending the crystalline bis-(cyclopentadienyl)chromium[II] compound and support under a dry inert atmosphere, and then reducing the pressure so as to cause the bis-(cyclopentadienyl)chromium[II] compound to sublime and adsorb onto the support.

The supported catalysts can also be prepared by a slurry technique whereby the selected and properly dried support is added, under conditions which exclude the presence of catalyst poisons, to a solution containing the bis-(cyclopentadienyl)chromium[II] compound and solvent to form a slurry. The slurry may be stirred for a period of up to about 4 hours to obtain good adsorption of the bis-(cyclopentadienyl)chromium[II] compound by the support. The solvent is then drained from the slurry and the catalyst is then used as so prepared, or the retained solvent can be evaporated under conditions which exclude catalyst poisons so as to yield a dry powdery supported catalyst.

The concentration of supported bis-(cyclopentadienyl) chromium[II] employed in this invention is not critical and generally only affects the rate and yield of polymer secured. It can be varied from about 1 to 100,000 preferably from 1 to 25,000, parts per million, based on the weight of olefin charged. Preferably, and for the greatest economy of operation, the catalyst concentration is maintained from about 5 to 100 parts per million. Obviously, the lower the impurity level in the reaction system, the lower the catalyst concentration that can be used. Experience has shown that yields greater than 300,000 parts of polymer per part of bis-(cyclopentadienyl)chromium[II] may be obtained. In such catalysts, the weight of the support is generally from 10 to 100 times the weight of the organochromium compound. However, this ratio is not critical and can be widely varied.

For use in a fluid bed reaction process, the supported catalysts are preferably capable of subdivision, which is the ability of the catalyst particles to rupture in the presence of a growing polymer and thereby extend itself to form many polymer particles of low catalyst residue content from a single catalyst particle.

The subdividable supported catalysts are preferably prepared, for instance, by depositing bis-(cyclopentadienyl) chromium[II] on supports of high surface area, which are porous. When incorporated on such porous supports the catalyst forms active sites on the surface and in the pores of the support. While not wishing to be bound by this theory, it is believed that the polymers begin to grow at the surface as well as in the pores of the catalyst, in the fluid bed reaction process. When a pore grown polymer becomes large enough, it ruptures the support thereby exposing fresh catalyst sites in the inner pores of the support. The supported catalyst during its lifetime in the fluidized bed may thus subdivide many times and enhance thereby the production of low catalyst residue content polymers, thereby eliminating the need for removing the catalyst from the polymer particles. If the support is too large, it may resist rupture thereby preventing subdivision and which would result in catalyst waste. In addition, a large support may act as a heat sink and cause "hot spots" to form. It has been found that supports having a particle size of the order of 250 microns or less display an ability to effectively rupture under the force of a growing polymer in a fluid bed.

The Monomers and Polymers

Among the α-olefins which can be polymerized with ethylene in accordance with the invention are those containing from 3 to about 10 carbon atoms. Illustrative thereof but not limiting are propylene, butene-1, pentene-1, 3-methylbutene-1, hexene-1, 4-methylpentene-1, 3-ethylbutene-1, heptene-1, octene-1, decene-1, 4,4-dimethylpentene-1, 4,4-diethylhexene-1, 3,4-dimethylhexene-1, 4-butyl-1-octene, 5-ethyl-1-decene, 3,3-dimethyl-butene-1, and the like. Such compounds can be polymerized in combination with a major amount of ethylene to yield normally solid, high molecular weight interpolymers of ethylene and one or more α-olefins. Ethylene (alone or with minor amounts of other α-olefins) may also be polymerized with one or more diolefins to yield normally solid, cross-linkable interpolymers. Among the diolefins which may be used are butadiene, 1,5-hexadiene, dicyclopentadiene, ethylidene norbornene, and the like. The ethylene homopolymers are the particularly preferred polymers. The preferred interpolymers are those containing a major proportion of interpolymerized ethylene along with a minor proportion of any other monomer copolymerizable therewith. The particularly preferred interpolymers are ethylene-propylene or ethylene-butene interpolymers which contain up to about 20 weight percent of interpolymerized propylene or butene.

POLYMERIZATION CONDITIONS

After the supported bis-(cyclopentadienyl)chromium-[II] catalysts have been formed, the polymerization reaction is conducted by contacting ethylene, alone, or with one or more other olefins, and in the substantial absence of catalyst poisons such as moisture and air, with a catalytic amount of the supported bis-(cyclopentadienyl)chromium[II] catalyst at a temperature and at a pressure sufficient to initiate the polymerization reaction. If desired, an inert organic solvent may be used as a diluent and to facilitate materials handling. The reaction may also be conducted in a fluidized bed, in the absence of a solvent.

The polymerization reaction is carried out at temperatures of from about 30° C. or less, up to about 200° C. or more, depending to a great extent on the operating pressure, the pressure of the olefin monomers, and the particular catalyst being used and its concentration. Naturally, the selected operating temperature is also dependent upon the desired polymer melt index since temperature is definitely a factor in adjusting the molecular weight of the polymer. Preferably, the temperature used is from about 30° C. to about 100° C. in a conventional slurry or "particle forming" process, and from 100° C. to 150° C. in a "solution forming" process and at a temperature of about 70 to 110° C. for fluid bed reactions. The control of temperature in these processes is desirable, as hereinafter more fully described, so as to provide various effects upon the molecular weight of the polymers, as well as to control the phase in which the polymers are made. As with most catalyst systems, the use of higher temperatures leads to the production of lower weight average molecular weight polymers, and consequently of polymers of higher melt index. In fact, by operating at the higher polymerization temperatures, it is possible to produce polymers having a melt index of 100 to 1000 or more. These high melt index polymers can be characterized as waxes.

The pressure to be used in the polymerization reactions can be any pressure sufficient to initiate the polymerization of the monomer(s) to high molecular weight polymer. The pressure, therefore, can range from subatmospheric pressures, using an inert gas as a diluent, to superatmospheric pressures of up to about 30,000 p.s.i.g. or more. The preferred pressure is from atmospheric up to about 1000 p.s.i.g. As a general rule, a pressure of 20 to 800 p.s.i.g. is most preferred. However, as can be seen from the discussion and the appended examples, a wide latitude of pressures can be employed to secure high molecular weight polymers.

The selection of an inert organic solvent medium to be employed in the solution or slurry processes of this invention is not too critical, but the solvent should be inert to the supported bis-(cyclopentadienyl)chromium-[II] catalyst and olefin polymer produced, and be stable at the reaction temperature used. It is not necessary, however, that the inert organic solvent medium also serve as a solvent for the polymer to be produced. Among the inert organic solvents applicable for such purposes may be mentioned saturated aliphatic hydrocarbons, such as hexane, heptane, pentane, isooctane, purified kerosene and the like, saturated cycloaliphatic hydrocarbons, such as cyclohexane, cyclopentane, dimethylcyclopentane and methylcyclohexane and the like, aromatic hydrocarbons such as benzene, toluene, xylene, and the like. Particularly preferred solvent media are cyclohexane, pentane, hexane and heptane.

When it is desired to conduct the polymerization to a high solids level in a solvent medium as hereinbefore set forth, it is of course desirable that the solvent be liquid at the reaction temperature. For example, when operating at a temperature which is lower than the solution temperature of the polymer in the solvent, the process can be essentially a slurry or suspension polymerization process in which the polymer forms as particles in the liquid reaction medium and in which the catalyst is suspended in a finely divided form.

The slurry system is of course dependent upon the particular solvent employed in the polymerization reaction and the solution temperature of the polymer prepared in such solvent. Consequently, in the "particle form" embodiment, it is most desirable to operate at a temperature which is lower than the normal solution temperature of the polymer in the selected solvent. For example, polyethylene, as prepared herein, has a solution temperature in cyclohexane of about 90° C., whereas in pentane its solution temperature is about 110° C. It is characteristic of this "particle form" polymerization system that a high polymer solids content is possible even at relatively low temperatures, as long as sufficient agitation is provided so as to insure adequate mixing of the monomer with the polymerizing mass.

Experiences has shown that the slurry technique can produce a system having more than a fifty percent solids content provided that sufficient fluidizing conditions and agitation are maintained. It is particularly preferable to operate the slurry process in the range of 30–40 weight percent of polymer solids.

Recovery of the polymer from the solvent medium can be simplified to a simple filtration and drying operation and no efforts need be expended in polymer clean up and catalyst separation or purification. The residual concentration of catalyst in the polymer is so small, that generally less than 2 to 10 parts of chromium per million parts of polymer can be achieved, and at such levels the catalyst residues are innocuous and unnoticed in the polymer. Expeditiously, they can be left in the polymer.

The use of reaction temperatures which are higher than the solution temperature of the polymer in the selected solvent medium can also provide a high polymer solids content in the resulting solution. The temperature to be used in this solution polymerization procedure must be high enough to enable the solvent being used to dissolve at least 25–30 percent by weight of the polymer. On the other hand, the reaction temperature must be low enough to avoid thermal destruction of the polymer being formed and the particular bis-(cyclopentadienyl)chromium[II] catalyst being employed. In general, for the various solvents and bis-(cyclopentadienyl)chromium[II] catalysts used, temperatures within the range of about 100° C. to about 150° C. and preferably about 120° C. to about 150° C. have been found to be generally optimum for the practice of such solution polymerization procedures. However, the particular polymer to be produced also has a controlling effect on the optimum temperature to be used. For example, ethylene-propylene copolymers produced by the solution process are soluble in many of these organic solvents at relatively low temperatures, and hence the use of such relatively low temperatures is permissible in this invention even though such temperatures may not be desired for the optimum production of ethylene homopolymers or other copolymers.

Solvents constitute one of the most significant and vexing sources of catalyst poisoning. Moreover, in prior solution polymerization processes which employ transition metal-containing catalysts, the use of large quantities of solvent, i.e., a solvent-to-polymer ratio of the order of 20:1, was believed necessary. Such large proportions of solvent necessarily greatly increased the catalyst poisoning problem. In the present process, however, the proportion of solvent to polymer can be lower than 20:1.

When a solvent serves as the principal reaction medium, it is of course desirable to maintain the solvent medium substantially anhydrous and free of any possible catalyst poisons, by redistilling or otherwise purifying the solvent before its use in such process. Treatment with an absorbent such as high surface area silicas, aluminas, molecular sieves and like materials are beneficial in removing trace amounts of contaminants that may reduce the polymerization rate or poison the catalyst during the reaction.

Still another advantage of the solution process is provided by maintaining the catalyst and the polymer, as formed, in homogeneous solution in the solvent medium. By avoiding the formation of a polymer suspension, the reaction mass behaves as a viscous fluid which can be pumped and handled by any of the standard techniques for handling fluids.

Still another advantage of having the polymer soluble in a solvent diluent is that relatively high reaction temperatures can be employed. This is advantageous because the high temperatures reduce the viscosity of the solution. They also cause the polymerization to proceed faster, and allow for a more efficient removal of the heat of reaction because of the large temperature differential between the reactor and the cooling water, and also permit control of the polymer molecular weight since high reaction temperatures generally cause the formation of lower molecular weight polymer. This latter factor is particularly important in the production of waxes of high melt index as is demonstrated hereafter in the appended examples.

It should be understood that the high solids system can be employed with the catalyst suspended in the solvent, provided that the necessary conditions of agitation, pressure, temperature, and the like are maintained so to provide contact of the monomer with the catalyst, and that the pressure and temperature are such as to initiate the polymerization of that monomer to the polymer.

EFFECT OF HYDROGEN ON CATALYST ACTIVITY

By conducting the polymerization reaction in the presence of hydrogen which appears to function as a chain transfer agent, the molecular weight of the polymer may be controlled and the yield of the polymerization reaction improved. The addition of hydrogen to the system surprisingly increases the activity of the catalyst, for comparative tests have shown that under identical reaction conditions the presence of hydrogen in the polymerization reaction increases the productivity of the catalyst (pounds of polymer produced per pound of catalyst) by as much as 20 percent.

Experience has shown that hydrogen may be used in the polymerization reaction in amounts varying between about 0.001 to about 10 moles of hydrogen per mole of ethylene. For most polymerization reactions, a narrow molecular weight distribution may be obtained by using from about 0.01 to about 0.5 mole of hydrogen per mole of ethylene. Stated another way, the preferred range of hydrogen is from about 0.001 to about 5 mole percent, based on the total reactor contents.

When ethylene is homopolymerized using a supported bis-(cyclopentadienyl)chromium[II] catalyst, then the relationship of the melt index of the polymer to the hydrogen and ethylene concentrations used in the polymerization reaction has been found to be governed by the equation $$\ln \mathrm{MI} = k \ln \frac{[A]}{[A+B]} + \ln C$$

where MI represents the melt index of the polyethylene, A represents the hydrogen concentration in mole percent, B represents the ethylene concentration in mole percent, $k$ and C represent empirically-determined constants for the particular supported bis-(cyclopentadienyl)chromium[II] catalyst used in the polymerization reaction, which constants are determined for the catalyst at a given catalyst concentration, support surface area, temperature of support activation and polymerization temperature. This relationship is shown in FIG. 1. By proper selection of a particular supported bis-(cyclopentadienyl)chromium[II] catalyst and hydrogen and ethylene concentrations, the polymerization reaction will yield a polyethylene having a predetermined melt index, a narrow molecular weight distribution, and being essentially free from internal and terminal unsaturation.

Figure 2:
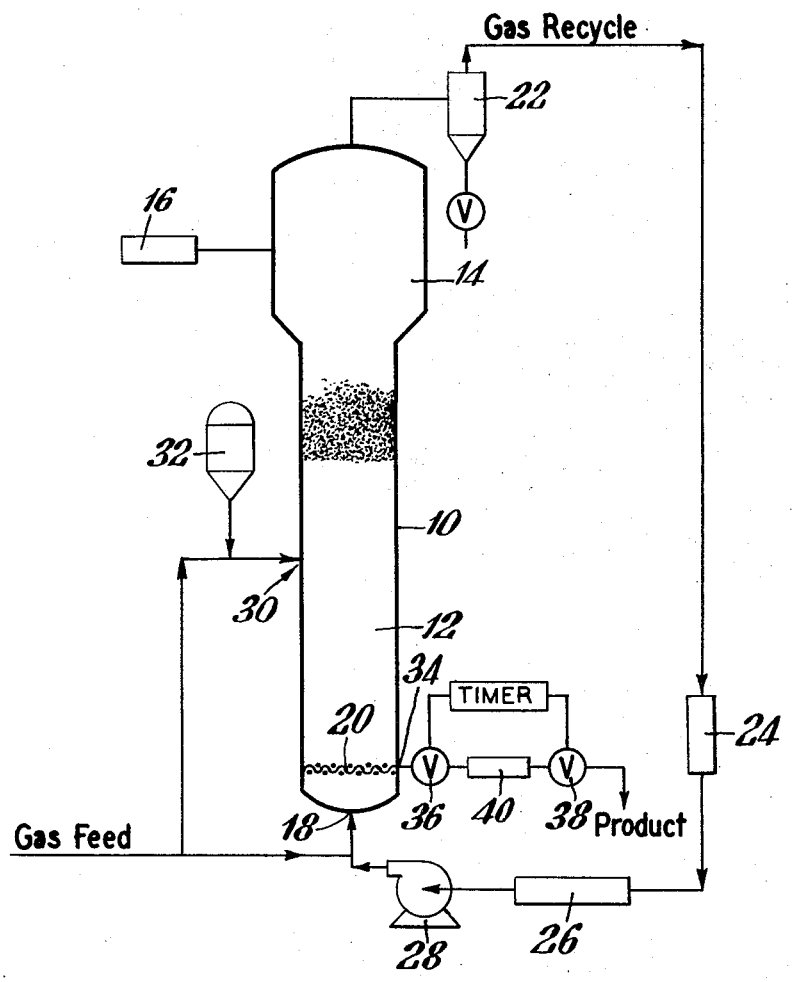
FIG. 2 shows a fluid bed reaction system in which the catalyst composition of the present invention may be used.

A fluidized bed reaction system used in the practice of this invention is illustrated in FIG. 2 of the drawings. With reference thereto, the reactor 10 consists of a reaction zone 12 and a velocity reduction zone 14.

The reaction zone 12 comprises a bed of growing polymer particles, formed polymer particles and a minor amount of catalyst fluidized by the continuous flow of polymerizable and modifying gaseous components in the form of make-up feed and recycle gas through the reaction zone. To maintain a viable fluidized bed, mass gas flow through the bed is above the minimum flow required for fluidization, preferably from about 2 to about 6 times $G_{mf}$ and more preferably from about 3 to about 5 $G_{mf}$. $G_{mf}$ is used in the accepted form as the abbreviation for the minimum mass gas flow required to achieve fluidization, C. Y. Wen and Y. H. Yu, "Mechanics of Fluidization," Chemical Engineering Progress Symposium Series, vol. 62, pp. 100–111 (1966).

It is essential that the bed always contain particles to prevent the formation of localized "hot spots" and to entrap and distribute the powdery catalyst of this invention throughout the reaction zone. On start up, the reaction zone is usually charged with a base of particulate polymer particles before gas flow is initiated. The particles may be identical in nature to the polymer to be formed, or different therefrom. When different, they are withdrawn with the desired formed polymer particles as the first product. Eventually, a fluidized bed of the desired particles supplants the start-up bed.

Catalyst concentration in the bed is substantially equal to the catalyst concentration in the product, namely in the order of about 0.005 to about 0.50 percent of bed volume.

The catalyst used in the fluidized bed is preferably stored for service in a reservoir 32 under a nitrogen blanket.

Fluidization is achieved by a high rate of gas recycle to and through the bed, typically in the order of about 50 times the rate of feed to make up gas. The fluidized bed has the general appearance of a dense mass of viable particles in possibly free-vortex flow as created by the percolation of gas through the bed. The free flow of the particles and, therefore, fluidization, is substantiated by the fact that the axial pressure drop through the bed is typically of the order of only about 1 pound per square inch gauge pressure.

Make-up gas is fed to the bed at a rate equal to the rate at which the particulate polymer product is withdrawn. The composition of the makeup is determined by a gas analyzer 16 positioned above the bed. The gas analyzer determines component deficiency in the gas being recycled and the composition of the make-up gas is adjusted accordingly to maintain an essentially steady state gaseous composition within the reaction zone.

To insure complete fluidization, the recycle gas and, where desired, part of the make-up gas are returned to the reactor at point 18 below the bed. There exists a gas distribution plate 20 above the point of recycle gas return to aid in fluidizing the bed.

The portion of the gas stream which does not react in the bed constitutes the recycle gas which is removed from the polymerization zone, preferably by passing it into a velocity reduction zone 14 above the bed where entrained particles are given an opportunity to drop back into the bed. Particle return may be aided by a cyclone 22 which may be part of the velocity reduction zone or exterior thereto. Where desired, the recycle gas may then be passed through a filter 24 designed to remove small particles at high gas flow rates to prevent dust from contacting heat transfer surfaces and compressor blades.

The recycle gas is then passed through a heat exchanger 26 wherein it is stripped of heat of reaction before it is returned to the bed. By constantly removing heat of reaction, no noticeable temperature gradient appears to exist within the bed. In particular, it has been observed that the bed acts to almost immediately adjust the temperature of the recycle gas to make it conform to the temperature of the bed, thereby maintaining itself at an essentially constant temperature under steady state conditions. The recycle gas is then compressed in a compressor 28 and returned to the reactor at its base 18, and to the fluidized bed through a distribution plate 20.

The distribution plate 20 plays an important role in the operation of the reactor. The fluidized bed contains growing and formed particulate polymer particles as well as catalyst particles. As the polymer particles are hot and possibly active, they must be prevented from settling, for if a quiescent mass is allowed to exist, any active catalyst contained therein may continue to react and cause fusion. Diffusing recycle gas through the bed at a rate sufficient to maintain fluidization at the base of the bed is, therefore, important. The distribution plate 20 serves this purpose and may be a screen, slotted plate, perforated plate, a plate of the bubble cap type and the like. Whatever its design, it must diffuse the recycle gas through the particles at the base of the bed to keep them viable, and also serve to support a quiescent bed of resin particles when the reactor is not in operation.

When used as a component of the gas stream, hydrogen is of significant utility in the vapor phase polymerization in the fluidized bed reactor. In vapor phase polymerization reactions, the melt index of the product is relatively insensitive to reaction temperatures in that a moderate change in operating temperature will not result in any significant change in the melt index of such product. Therefore, an alternate means to modify, where desired, the melt index of the polymer product must be resorted to. It has been found that hydrogen influences the melt index of the product. In general, the melt index of the product increases with an increase in the hydrogen concentration in the gas stream.

Hydrogen also surprisingly increases the activity of the catalyst, for comparative tests have shown that, under identical reaction conditions, the presence of hydrogen in the polymerization reaction increases the productivity of the catalyst (pounds of polymer produced per pound of catalyst) by as much as 20 percent.

Experience has shown that hydrogen may be used in the fluid bed polymerization reaction in amounts varying between about 0.001 to about 10 moles of hydrogen per mole of ethylene. For most fluid bed polymerization reactions, a narrow molecular weight distribution may be obtained by using from about 0.01 to about 0.5 mole of hydrogen per mole of ethylene.

When making copolymers of ethylene with propylene, or with other monomers which are less reactive than ethylene, the presence of hydrogen has also been found to enhance the reactivity of the lesser reactive monomer.

Also, if desired for control in the fluid bed system, any gas inert to the catalyst and reactants can be present.

It is essential to operate the fluid bed process at a temperature which is below the sintering temperature of the polymer particles. To insure that sintering will not occur, operating temperatures considerably below the sintering temperature are desired. For the production of the ethylene homopolymers an operating temperature of from about 70 to about 110° C. is preferred whereas an operating temperature of about 90° C. or lower is preferred for the copolymers, in the fluid bed process.

The fluid bed process is operated at a pressure of from about 40 to 300 p.s.i. or more, with operation at intermediate and elevated pressures favoring heat transfer since an increase in pressure increases the unit volume heat capacity of the gas.

The catalyst is injected into the fluid bed at a rate equal to its consumption at a point 30 which is above the distribution plate 20. Preferably, the catalyst is injected at a point located about ¼ to ¾ of the way up the side of the bed. Injecting the catalyst at a point above the distribution plate is an important feature of this invention. Since the catalysts used in the practice of the invention are highly active, injection into the area below the distribution plate may cause polymerization to begin there and eventually cause plugging of the distribution plate. Injection into a viable bed, however, aids in distributing the catalyst throughout the bed and tends to preclude the formation of localized spots of high catalyst concentration which may result in the formation of "hot spots."

All or part of the make-up feed stream is used to carry the catalyst into the bed. It is preferred to use only a part of the make-up feed stream as the carrier for the catalyst since, when operating at high productivity rates, the injection of a large amount of gas into the side of the bed may disrupt the characteristics of the bed and cause channeling or the like. As an alternative procedure, part of the recycle gas stream can be diverted for the purposes of carrying the catalyst into the bed.

The productivity of the bed is solely determined by the rate of catalyst injection. The productivity of the bed may be increased by simply increasing the rate of catalyst injection and decreased by reducing the rate of catalyst injection.

Since any change in the rate of catalyst injection will change the rate of the generation of heat of reaction, the temperature of the recycle gas is adjusted upwards or downwards to accommodate the change in the rate of heat generation. This insures the maintenance of an essentially constant temperature in the bed. Complete instrumentation of both the fluidized bed and the recycle gas cooling system is, of course, necessary to detect any temperature change in the bed and thereby enable the operator to make a suitable adjustment in the temperature of the recycle gas.

Under a given set of operating conditions, the fluidized bed is maintained at essentially a constant height by withdrawing a portion of the bed as a particulate polymer product at a rate equal to the rate of formation of such product. Since the rate at which heat is generated is directly related to the rate at which the product is formed, thermal analysis of the gas leaving the reactor is determinative of the heat of particulate polymer formation.

The particulate polymer product is preferably continuously withdrawn at a point 34, at or close to the dispersion plate 20, in suspension with a portion of the gas stream. The carrier gas is vented before the particles settle to preclude further polymerization and sintering when the particles reach their ultimate collection zone. The suspending gas may also be used, as mentioned above, to drive the product of one reactor to another reactor.

The particulate polymer product is conveniently and preferably withdrawn through the sequential operation of a pair of timed valves 36 and 38 which define a segregation zone 40. While valve 38 is closed, valve 36 opens to emit a plug of gas and product to the zone 40 and valve 36 is then closed. Valve 38 is then opened to deliver the product to an external recovery zone. Valve 38 is then closed to await the next sequence.

Finally the fluidized bed reactor is equipped with an adequate venting system to allow for venting of the bed during start up and shut down.

When used in the fluid bed reactor, the supported bis-(cyclopentadienyl)chromium[II] catalyst system of this invention appears to yield a product having an average particle size between about 40 and 100 mesh, and wherein the catalyst and carrier residue content is unusually low.

In operating the fluidized bed reactor of this invention several advantages have been observed as compared to the use of the slurry and solution processes.

A major observation is that there does not appear to be a tendency for the polymer to coat the reactor walls. The formation of a polymer coat on the walls of slurry and solution reactors is a relatively uncontrollable and unpredictable phenomenon which hinders heat transfer and may cause clumps of polymer to "break-off" into the system.

Based on the productivity rates that may be obtained therewith the fluid bed reactor appears to offer reduced installation and operating costs. It is also more stable in that it tends to naturally dampen any sudden change in operating conditions. There appears, therefore, to be more leeway in operating the fluidized bed reactor.

Finally, a most significant advantage is an improved ability to control gas composition. Gas composition in the slurry and solution reactors is limited by monomer solubility and diffusivity. Since there are no liquids employed in the fluidized bed reactor, the gas composition is essentially infinitely variable and the gas compositions that may be practically employed are governed only by the relative reactivities of the monomers present.

EXAMPLES

The following examples are merely illustrative of the present invention and are not intended as a limitation upon the scope thereof.

The properties of the polymers produced in the examples were determined by the following test methods:

Density: ASTM D-1505—Plaque is conditioned for one hour at 120° C. to approach equilibrium crystallinity.
Melt index: ASTM D-1238—Measured at 190° C. (reported as grams per 10 minutes).
Flow rate: ASTM D-1238—Measured at 10 times the weight used in the melt index test above (high load melt index test).

$$\text{Flow ratio} = \frac{\text{Flow rate}}{\text{Melt index}}$$

Stiffness: ASTM D-638.
Tensile impact: ASTM D-256—Specimen is not notched and is clamped in an Izod Impact Tester in such a way that it is broken in tension.

EXAMPLE 1

Into an autoclave were placed 500 ml. of dry hexane and 0.4 g. of ID silica which has been previously activated by heating at 580° C. in a nitrogen atmosphere for 24 hours. After the reactor was well purged with argon, 2 ml. of bis-(cyclopentadienyl)chromium[II] dissolved in hexane (5 mg./ml.) was added, after which the reactor was sealed and heated to 70° C. At this temperature, the autoclave was pressurized with 200 p.s.i.g. of ethylene. For the duration of the polymerization period, ethylene was fed on demand to maintain a pressure of 200 p.s.i.g. After the 30 minute polymerization period at 70° C., the flow of ethylene was stopped, the reactor was vented and then taken apart. The reaction yielded 100 g. of polyethylene having a melt index of zero. The polymer contained virtually no branching (methyl content by infrared was determined to be less than 0.1%) and substantially no unsaturation (i.e., less than 0.03%).

EXAMPLE 2

The same procedure as in Example 1 was used, with the exception that at 70° C. the reactor was pressurized with 30 p.s.i.g. of hydrogen. Ethylene was then added to the reactor until the total pressure of hydrogen and ethylene reached 200 p.s.i.g. At the end of 30 minutes, polymerization was stopped by venting the reactor, yielding 120 g. of polyethylene having a melt index of 1.7 and a high load melt index of 73. The addition of hydrogen increased the catalyst productivity by 20 percent, as evidenced by the higher yield of polyethylene when compared to that obtained in Example 1.

EXAMPLE 3

Ethylene was polymerized in the presence of a silica-supported bis-(cyclopentadienyl)chromium[II] catalyst following the same procedure as employed in Example 1, with the exception that 30 mg. of $(C_5H_5)Cr$ was used. The reaction was conducted at a temperature of 120°–130° C., and under 400 p.s.i.g. of ethylene pressure. At this temperature, the polymerization reaction proceeds in the solution. After 15 minutes of polymerization, there was obtained 60 g. of polyethylene having a melt index of 19.5 and a high load melt index of 486 and having 0.30 weight percent trans and 0.10 weight percent vinyl unsaturation.

EXAMPLE 4

The same procedure was employed as in Example 3. A polymerization was conducted at 155°–160° C. under 450 p.s.i.g. of ethylene pressure. The catalyst consisted of 30 mg. $(C_5H_5)_2Cr$ and 0.4 g. MSID silica previously activated at 760° C. for 18 hours. After 30 min. of polymerization time 61 g. of a low molecular weight wax was produced. This wax was too fluid for a melt index measurement to be obtained thereon. This was contained 1.65 wt. percent trans-internal unsaturation and 0.42 wt. percent vinyl unsaturation.

EXAMPLE 5

The data shown in the following Table I illustrates the changes in the melt index properties of the polyethylene products which may result from a change in the temperature of activation of the support. Three supported bis-(cyclopentadienyl)chromium[II] catalysts were prepared by adsorbing 10 mg. of $(C_5H_5)_2Cr$ onto each of three 0.4 gram samples of ID silica. Each of the silica materials had been heated for 24 hours in a nitrogen atmosphere at the different temperatures shown below. These catalysts were then used to polymerize ethylene in reactions which were conducted at a temperature of 70° C., using 30 p.s.i.g. of hydrogen and a total pressure of 200 p.s.i.g. The polymerization time was 30 minutes in each case. The support activation temperature used for the different catalyst supports, and the melt index (MI) and high load melt index (HLMI) properties of the resulting polymers is thus shown in Table I:

TABLE I

| Temperature of activation of the support (° C.) | Melt index properties of the resulting polymers | |
|---|---|---|
| | MI | HLMI |
| (a) 465 | 0.30 | 13 |
| (b) 580 | 1.70 | 73 |
| (c) 670 | 2.70 | 119 |

EXAMPLE 6

Ethylene and propylene were interpolymerized using the same procedure as in Example 1, with the exception that when the reactor was heated to 70° C. the reactor was then pressurized with 20 p.s.i.g. of hydrogen and 70 p.s.i.g. of propylene and with sufficient ethylene to make the total pressure equal to 200 p.s.i.g. After a 30 minute polymerization period, 36 g. of a copolymer having a melt index of 1.1 and a high load melt index of 42 was obtained. The methyl content of the resin, when measured by infrared analysis, was 0.79 (equivalent to 1.55 weight percent of incorporated propylene). The density of the copolymer was 0.932.

EXAMPLE 7

Ethylene and ethylidenenorbornene were interpolymerized using the same procedure employed as in Example 1 with the exception that after the addition of the $(C_5H_5)_2Cr$, a total of 10 ml. of ethylidenenorbornene was added to the reactor. In 60 minutes polymerization time, 100 g. of copolymer having a melt index of 0.1 and a high load melt index of 14 was obtained. The resin contained 0.97 weight percent methyl. The density of the copolymer was 0.947.

EXAMPLE 8

Two homopolymers of ethylene (A and B) were prepared in a continuous reactor. The solvent employed was isopentane and the supported catalyst consisted of 94 weight percent of ID silica (previously dried at 650° C. for 24 hours in $N_2$ atmosphere) and 6 weight percent of bis-(cyclopentadienyl)chromium[II]. The conditions of the polymerization reactions and the properties of the two polymers thus produced are summarized in Table II:

TABLE II

| Reaction conditions | Polymer A | Polymer B |
| --- | --- | --- |
| Ethylene concentration | 20.0 mol percent | 19.5 mol percent. |
| Hydrogen concentration | 0.16 mol percent | 0.34 mol percent. |
| Reactor pressure | 450 p.s.i | 450 p.s.i. |
| Reactor temperature | 90° C | 90° C. |
| Yield and polymer properties | | |
| Catalyst productivity | 8,000 lb. resin/lb. cat | 5,900 lb. resin/lb. cat. |
| Melt index | 1.15 | 14.5. |
| Density | 0.9698 | 0.9745. |

EXAMPLE 9

Into a one liter autoclave were placed 500 ml. of dry hexane. The reactor was placed under a continuous purge of argon, after which 0.4 g. of ID silica (which had been previously dried at 550° C. for 24 hours in a nitrogen atmosphere) was then added. Bis-(cyclopentadienyl) chromium[II] (10 mg.) was then introduced into the reactor, which was sealed, and heated to a temperature of 85° C. The autoclave was vented and pressurized with 50 p.s.i.g. of hydrogen to activate the catalyst. The contents of the reactor were stirred at 90° C. for 30 minutes. Excess hydrogen was then vented off, and the reactor then pressurized with 200 p.s.i.g. of ethylene. Ethylene was fed on demand to maintain a pressure of 200 p.s.i.g. throughout the polymerization period. After 1 hour of polymerization, there was obtained 37 g. of polyethylene having a melt index of 0.13 and a high load melt index of 6.15.

A second hydrogen activated catalyst was prepared as disclosed above, using a catalyst prepared from 20 mg. of bis-(cyclopentadienyl)chromium[II] and activated with 30 p.s.i.g. of hydrogen. This catalyst was then used to polymerize ethylene, as disclosed above, for 30 minutes. 86 grams of polyethylene were thus obtained. The polymer had a melt index of 0.10 and a high load melt index of 4.10.

EXAMPLE 10

Into a stirred one liter autoclave, purged continually with argon, were placed 500 ml. of dry hexane and 0.4 g. of Intermediate Density silica which had been previously dried by being fluidized in nitrogen at 550° C. for 46 hours. Bis-(cyclopentadienyl)chromium[II] (5 mg.) was introduced in the form of hexane solution (5 mg./ml.) via a hypodermic syringe. The bis-(cyclopentadienyl) chromium[II] had been previously prepared in tetrahydrofuran according to the procedure of F. A. Cotton and G. Wilkinson, Ziet. f. Naturforsch., 90, 417 (1954). After the bis-(cyclopentadienyl)chromium[II] was introduced, the reactor was sealed, warmed to a temperature of 90° C., then vented and pressurized with 200 p.s.i.g. of ethylene. During the reaction period, which continued for 30 minutes, the ethylene was fed on demand to maintain a pressure of 200 p.s.i.g. At the end of the polymerization period, the ethylene feed was discontinued, the reactor was cooled to 70° C., vented and dismantled. The yield of dry polyethylene was 60 g. and the product had a high load melt index of 0.

EXAMPLE 11

Into a stirred one-liter autoclave, purged continually with nitrogen, were placed 500 ml. of dry hexane and 0.5 g. of silica-alumina which had been previously dried at 500° C. for 18 hours. Bis-(cyclopentadienyl)chromium-[II] (20 mg.) was then introduced and the reactor was sealed. Next, the reactor was heated to 90° C. and pressurized with 400 p.s.i.g. of ethylene. During the reaction period, the ethylene was fed on demand to maintain a pressure of 400 p.s.i.g. In 45 minutes of polymerization time at 90–115° C. 165 g. of polyethylene was produced which had a high load melt index of 0.

EXAMPLE 12

Ethylene was polymerized following the same procedure as in Example 10, with the exception that the reactor was pressurized with 30 p.s.i.g. of hydrogen at 85° C. After the temperature of the reactor reached 90° C., it was pressurized with ethylene so that the total pressure was 200 p.s.i.g. After a 30 minute polymerization period at 90° C., 70 g. of polyethylene was obtained. The polymer had a melt index of 1.64, a high load melt index of 85.5 and a density of 0.955. The resin was almost free of unsaturation (IR spectrum showed only traces of adsorptions at $10.4\mu$ and $11.0\mu$).

EXAMPLE 13

Ethylene was polymerized following the same procedure as in Example 12, with the exception that 50 p.s.i.g. of hydrogen was used. After a 30 minute polymerization period at 90° C., 64 g. of polyethylene was obtained which had a melt index of 24.0.

EXAMPLE 14

Ethylene was polymerized following the same procedure as in Example 12, except that the reactor was pressurized with 30 p.s.i.g. of hydrogen at 70° C. After a 60 minute polymerization period at 70° C., 124 g. of polyethylene was obtained which had a melt index of 1.08 and a high load melt index of 44.7.

EXAMPLE 15

Ethylene and propylene were copolymerized following the same procedure as in Example 12. In this experiment, which was conducted at 70° C., the reactor was first pressurized with 20 p.s.i.g. of hydrogen, then with 70 p.s.i.g. of propylene, and lastly with ethylene up to 200 p.s.i.g. of total pressure. In 30 minutes of polymerization time, 36 g. of an ethylene-propylene interpolymer were obtained. The polymer contained 1.6 weight percent of propylene and had a melt index of 1.11 and a high load melt index of 42.8.

EXAMPLES 16–23

The following Table III summarizes a series of polymerization reactions in which ethylene was polymerized in the presence of a supported bis-(cyclopentadienyl) chromium[II] catalyst in accordance with the invention. Table III lists the type of support and the amount of the organochromium compound used in preparing the catalyst used in each of the examples, as well as the reaction conditions employed therein, and the yield and melt index properties of the resulting polymers. The supports used in Examples 16–21 were activated at 550° C., and the supports used in Examples 22–23 were activated at 540° C.

TABLE III

| Example | Support | Catalyst, m. gms. (C₅H₅)₂Cr | Polymerization P.s.i.g. H₂ | Time, min. | Temp., °C. | Polymer yield, gms. | Melt index IP | Melt index 10P |
|---|---|---|---|---|---|---|---|---|
| 16 | ID-silica | 5 | 0 | 30 | 90 | 60 | 0 | 0 |
| 17 | do | 5 | 30 | 30 | 90 | 70 | 1.64 | 85.5 |
| 18 | do | 5 | 50 | 30 | 90 | 64 | 24 | |
| 19 | do | 5 | 30 | 60 | 70 | 124 | 1.08 | 44.7 |
| 20 | do | 4 | 20 | 60 | 70 | 129 | 0.60 | 27.2 |
| 21 | do | 5 | 30 | 60 | 80 | 109 | 1.67 | 102 |
| 22 | 968 silica | 10 | 30 | 30 | 90 | 89 | 13.6 | |
| 23 | Silica-alumina | 5 | 60 | 60 | 90 | 43 | 0.03 | 1.86 |

EXAMPLE 24

A catalyst was prepared by vapor deposition of $(C_5H_5)_2Cr$ onto ID silica in the absence of solvent. The crystalline $(C_5H_5)_2Cr$ (0.4 g.) was mixed with 10 g. of dry ID silica (dried at 600° C. for 18 hours in a nitrogen stream) under an argon atmosphere. The container was evacuated to 2 mm. Hg vacuum and shaken. This procedure was repeated about ten times in a period of 6 hours. The pressure inside the container was then equalized with argon to atmospheric pressure. The catalyst was stored for three days and a portion (0.4 g.) was removed and used to polymerize ethylene under the conditions set forth in Example 2. After one hour of reaction time, 87 g. of a polymer having a melt index of 3.9, a flow rate or high load melt index of 148, and a density of 0.963, was thereby obtained.

EXAMPLE 25

Preparation of catalyst 300 grams of a silica base of the following composition:

| Component: | Weight percent, dry basis |
|---|---|
| $Al_2O_3$ | 0 |
| $SiO_2$ | 99.95 |
| $Na_2O$ | 0.05 |
| $SO_4$ (water soluble) | 0 | and with the physical properties of:

| Mesh size, U.S. Standard: | Weight percent larger than |
|---|---|
| 60 | max 0.0 |
| 100 | max 4.0 |
| 140 | max 10.0 |
| 200 | 9–33 |

Surface area—338 sq. meter per gram
Pore diameter (av.)—170 angstroms was dried in a nitrogen atmosphere at a temperature of 650° C for 12 hours, cooled under a nitrogen blanket, and added to a 3-liter glass flask with ground glass standard taper connections and a sintered glass fused in the bottom with a drain tube brought out through a stop cock. The flask was also fitted with a stirrer, a thermometer and an electric heating jacket. Special care was taken to use only tubing impervious to oxygen and water at all connections. All vents were brought out through bubble traps and the fitted flask has been purged with nitrogen before the silica base was added.

Sufficient isopentane was added to make a slurry and 300 cc. of an isopentane solution containing 9 grams of bis-(cyclopentadienyl)chromium[II] were added to the slurry. After stirring the system for 4 hours, the solvent was drained off through the sintered filter bottom. The flask was warmed to 40° C. and a small sparge of nitrogen was passed across the top of the flask to remove the remaining solvent. A free flowing particulate powder was obtained. This powder was dark red in color. The liquor drained off was clear, and water-white, but became dark green when exposed to air, indicating a minor amount of chromium residue.

The catalyst was fed under a nitrogen blanket to the catalyst reservoir of a large fluidized bed reactor of the type shown in FIG. 2 of the drawings and having a lower reactor section 2 feet in diameter and 12 feet high and a top section 3.5 feet in diameter and 3.5 feet high. The fluidized resin bed in the reactor section was from 7 to 10 feet deep and supported by a 60 mesh stainless steel wire screen which was in turn supported by steel bars. The reactor had been prepared for use by filling it with clean, dry, particulate polyethylene. Moisture and oxygen had been removed by recirculating nitrogen or ethylene at 80 to 90° C. The bed was further conditioned by fluidizing the particulate polyethylene with nitrogen at 80 to 100° C. while adding sufficient triethylaluminum to react with all the moisture and other trace poisons that may remain. The nitrogen was then vented off and the ethylene feed was started, followed by the start of the catalyst feed into the side of the bed, thereby initiating the reaction. The catalyst showed a productivity of 500 pounds of polyethylene per pound of catalyst.

EXAMPLES 26–29

The relationship between melt index of an ethylene polymer, and the hydrogen and ethylene concentrations of the reaction system used to prepare the polymer is shown in FIG. 1 of the drawings. This relationship is depicted by a straight line having a relatively steep slope. The slope of the line will vary to some degree, though minor, depending the reactions conditions, the concentrations of reactants, and the catalyst being used in the reactions. The specific linear relationship depicted in FIG. 1 was plotted on the basis of four polymerization reactions wherein different ratios of hydrogen to ethylene were employed. In each of these reactions ethylene was homopolymerized in isopentane at about 90° C. using a silica supported bis-(cyclopentadienyl)chromium[II] catalyst which had been prepared from 6 parts by weight of bis-(cyclopentadienyl)chromium[II] deposited on 94 parts by weight of ID silica which had been dried at 650° C. for 24 hours in a nitrogen atmosphere. The reactions were run under a total pressure of about 290–310 p.s.i.g.

For these reaction conditions the following formula was used for the purposes of plotting the line shown in FIG. 1:

$$MI = (3.39 \times 10^5) \left( \frac{[H_2]}{[H_2]+[C_2H_4]} \right) 2.27$$

The ethylene and hydrogen concentrations used in each of these examples, as well as the melt index and other properties of the resulting polymers are shown in the following Table IV:

TABLE IV

| Example | 26 | 27 | 28 | 29 |
|---|---|---|---|---|
| $C_2H_4$ concentration (mole percent) | 17.7(±10%) | 16.7(±16%) | 16.3(±10%) | 17.7(±9%) |
| $H_2$ concentration (mole percent) | 0.033(±38%) | 0.063(±20%) | 0.100(±23%) | 0.134(±18%) |
| $H_2$ mole fraction $(H_2/H_2+C_2H_4)$ | 0.0018(±36%) | 0.0038(+24%) | 0.006(+30%) | 0.0075(±14%) |
| Melt index (dgm./min.) | 0.21(±42%) | 1.04(±38%) | 2.99(±36%) | 5.5(±18%) |
| Flow index range | 14–19 | 32–54 | 135–195 | 240–325 |
| Flow ratio (average) | 50 | 52 | 50 | 47 |
| Density (gm./cc.) | 0.957 | 0.961 | 0.964 | 0.965 |

What is claimed is:

1. A process for the polymerization of ethylene which comprises contacting ethylene, in the absence of hydrogen or in the presence of no more than a molecular weight controlling amount of hydrogen, with a catalytic amount of a bis-(cyclopentadienyl)chromium [II] compound adsorbed on an activated inorganic oxide catalyst support having a high surface area and selected from the group consisting of silica, alumina, thoria, zirconia and mixtures thereof, at a temperature and at a pressure sufficient to initiate the polymerization reaction to form a normally solid polymer.

2. The process according to claim 1 in which ethylene is homopolymerized to a normally solid, high molecular weight polyethylene.

3. The process according to claim 1 in which a major amount of ethylene and a minor amount of at least one other α-olefin are interpolymerized to a normally solid, high molecular weight interpolymer of ethylene and the α-olefin.

4. A process as in claim 3 in which ethylene and propylene are interpolymerized.

5. The process according to claim 1 in which a major amount of ethylene and a minor amount of at least one diolefin are interpolymerized to a normally solid, cross-linkable interpolymer.

6. A process as in claim 5 in which ethylene and ethylidene norbornene are interpolymerized.

7. A process as in claim 1 in which said solid polymer has a melt index of 0 to 1000 decigrams per minute when measured by Standard ASTM Test Method D–1238–62T.

8. A process as in claim 7 in which said solid polymer has a melt index of 0 to about 100 decigrams per minute.

9. A process as in claim 8 in which said solid polymer has a melt index of 0 to about 24 decigrams per minute.

10. A process as in claim 1 in which said solid polymer is a wax.

11. A process as in claim 1 in which said catalyst support is silica.

12. A process as in claim 1 in which said catalyst support is silica-alumina.

13. A process as in claim 1 which is conducted in an inert organic solvent.

14. A process as in claim 13 which is conducted under particle forming conditions.

15. A process as in claim 13 which is conducted under solution forming conditions.

16. A process as in claim 1 which is conducted in a fluid bed reactor.

17. A process as in claim 1 which is conducted in the presence of up to about 10 moles of hydrogen per mole of ethylene.

18. A process as in claim 17 which is conducted in the presence of up to about 0.5 mole of hydrogen per mole of ethylene.

19. A process for the polymerization of ethylene which comprises contacting ethylene, in the substantial absence of catalyst poisons, and in the absence of hydrogen or in the presence of no more than a molecular weight controlling amount of hydrogen, with a catalytic amount of bis-(cyclopentadienyl)chromium[II] on an adsorbed activated inorganic oxide catalyst support having a high surface area and selected from the group consisting of silica, alumina, thoria, zirconia and mixtures thereof, at a temperature and at a pressure sufficient to initiate the polymerization reaction to form a normally solid, high molecular weight ethylene polymer having a narrow molecular weight distribution and being essentially free from internal and terminal unsaturation.

20. A process for the polymerization of ethylene which comprises:

(a) contacting bis - (cyclopentadienyl)chromium[II] with a substantially anhydrous activated silica having a surface area in the range of from about 50 to about 1000 square meters per gram in such manner that the organochromium compound is adsorbed on the silica, thereby forming a silica-supported bis-(cyclopentadienyl)chromium[II] catalyst, (b) contacting ethylene, in the substantial absence of catalyst poisons, with a catalytic amount of the silica-supported bis-(cyclopentadienyl)chromium[II] catalyst, in the absence of hydrogen or in the presence of no more than a molecular weight controlling amount of hydrogen, and at a temperature and at a pressure sufficient to initiate the polymerization reaction to form a normally solid, high molecular weight polyethylene having a narrow molecular weight distribution and being essentially free from internal and terminal unsaturation.

21. The process according to claim 20 in which the polymerization reaction is conducted at a temperature in the range from about 30° C. to about 150° C. and at a pressure in the range from about 20 p.s.i.g. to about 800 p.s.i.g.

22. The process according to claim 21 in which the polymerization reaction is conducted in the presence of from about 0.001 to about 10 moles of hydrogen per mole of ethylene.

23. The process according to claim 22 in which the melt index of the resultant polyethylene is controlled to a predetermined value by using during the polymerization reaction an ethylene and hydrogen concentration computed from the formula:

$$\ln MI = k \ln \frac{[A]}{[A+B]} + \ln C$$

where MI represents the melt index of the polyethylene, A represents the hydrogen concentration in mole percent, B represents the ethylene concentration in mole percent, and $k$ and $C$ represent empirically-determined constants for the particular silica-supported bis-(cyclopentadienyl)chromium[II] catalyst measured at a given catalyst concentration, support surface area, temperature of support activation and polymerization temperature.

References Cited

UNITED STATES PATENTS

| 3,051,690 | 8/1962 | Vandenberg | 260—88.2 |
| 3,157,712 | 11/1964 | Walker et al. | 260—683.15 |
| 3,163,682 | 12/1964 | Walker et al. | 260—683.9 |
| 3,324,101 | 6/1967 | Baker et al. | 260—94.9 |
| 3,454,538 | 7/1969 | Naarmann et al. | 260—94.9 |

FOREIGN PATENTS 1,591,425  4/1970  France.

JAMES A. SEIDLECK, Primary Examiner

E. J. SMITH, Assistant Examiner

U.S. Cl. X.R.

260—85.3, 88.2 R, 94.9 C, 94.9 DA, 94.9 P, 683.15 D